H. P. ECKLES.
Combined Cultivator and Hoe.
No. 78,442.
Patented June 2, 1868.
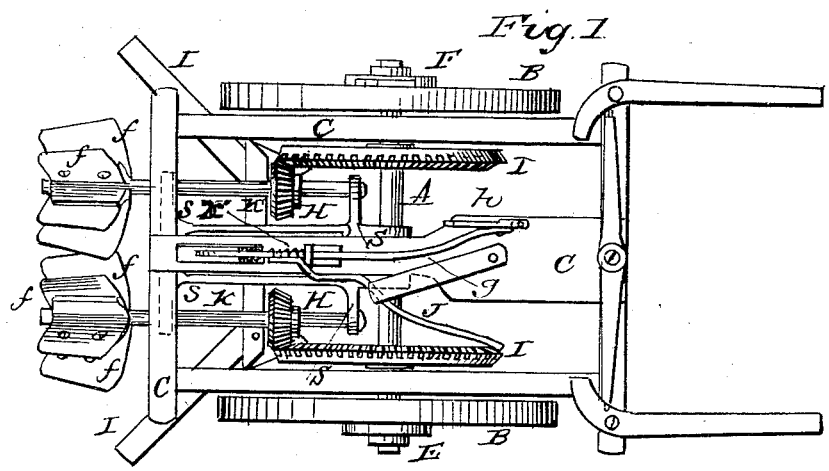
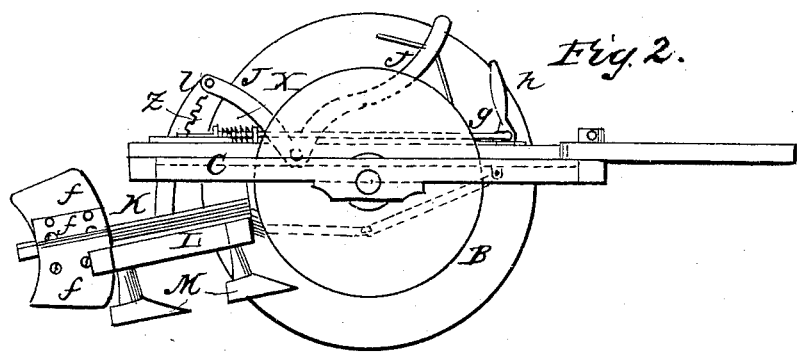
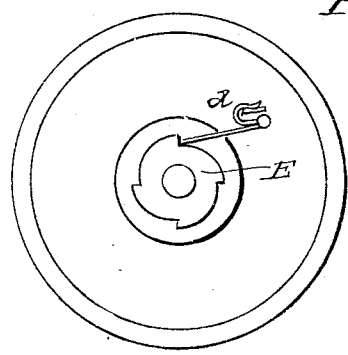

UNITED STATES PATENT OFFICE.

HARMON P. ECKLER, OF CATSKILL, NEW YORK.

IMPROVEMENT IN COMBINED CULTIVATOR AND HOE.

Specification forming part of Letters Patent No. 78,442, dated June 2, 1868.

*To all whom it may concern:*

Be it known that I, H. P. ECKLER, of Catskill, in the county of Greene, and in the State of New York, have invented certain new and useful Improvements in Combined Cultivator and Hoe; and I do hereby declare that the following is a full, clear, and exact description thereof, reference being had to the accompanying drawings and the letters of reference marked thereon.

In the annexed drawings, making a part of this specification, Figure 1 represents a top view, and Fig. 2 represents a section, of my cultivator and hoe or ridging device. Fig. 3 represents a side view of one of the wheels, with its catch, and the ratchet-wheel, which is rigidly secured to the axle.

A represents the shaft or axle, on which is loosely adjusted the carriage and drive-wheels B B.

Rigidly secured to the shaft or axle A are beveled-gear wheels I I and ratchet-wheels E E.

C represents a suitable frame, adjusted upon the axle A, as seen in the drawings, and S represents another frame, hung or loosely attached to the shaft A, beneath the rear end of the frame C. The frame S forms bearings for the shafts K K, to which are attached the gear-wheels H H, which mesh with and are operated by means of the gear-wheels I I.

To the rear end of the shafts K K are secured by means of a suitable hub the fans or paddles $ff$, which are designed to throw the earth up into ridges and against the plants to be cultivated.

L represents another frame, made similar to a cultivator-frame, in which is secured the cultivator teeth or plows M M. The frame L is attached or fastened to the under side and near the front end of the frame C, by means of a suitable rod. (Shown in dotted lines in Fig. 2 of the drawings.)

Secured to the lower frame, L, and extending up through a slot in the frame C, is a ratchet-bar, $l$, which is attached at its upper end to the elbow-lever $j$. The lever $j$ is pivoted to the top of the frame C, and by means of it the operator raises the rear end of the frames L and S, with the shafts K K, to any elevation desired, so that the teeth M of the cultivator and the paddles $ff$ of the hilling or ridging device may slide just at or work near the surface of the ground, or may be elevated entirely above the ground while being taken from one place to another. The frames are held up, after being elevated by the lever $j$, by means of the sliding rod or bar $g$, which catches in the teeth of the ratchet-bar $l$, and which is operated one way by means of the spring $x$ and the other way by means of the lever $z$.

A seat for the driver or operator is intended to be adjusted on the frame C, over the axle A, and the wheels B B should be made with teeth or projections, so as to take hold of the earth and prevent them from slipping.

It will be seen that the operator may regulate the depth of plows or teeth M M and the fans or paddles $ff$ to suit the kind of plant to be cultivated.

The ratchet-wheels E E are designed, together with the spring catches $d\ d$, to hold the wheels B B from turning on the axle A when being drawn forward; but it will readily be seen that they will turn thereon when turned around or backed. The spring-catch $d$ is secured to the outside of the wheel B, as shown.

The advantages of this device are obvious, as the corn or plants are hoed or hilled up at the same time with the same machine and team that they are cultivated, thereby saving one-half of the work of attending to the crop.

Having thus fully described my invention, what I claim as new, and desire to secure by Letters Patent, is—

1. The fans or paddles $ff$, when attached to shafts K K and operated substantially as and for the purpose specified.

2. The combination of the shafts A and K K, gear-wheels I I and H H, and frame S, when arranged substantially as described, and for the purpose of operating the paddles or plates $ff$ as herein specified.

3. The combination of the cultivator-frame L, with its teeth M M, secured to the frame C, as described, with the shafts K K, frame S, and paddles $ff$, for the purpose of cultivating or pulverizing the earth and ridging or hilling the same at one and the same time, as herein set forth.

In testimony that I claim the foregoing I have hereunto set my hand this 26th day of March, 1868.

HARMON P. ECKLER.

Witnesses:
 EDGAR RUSSELL,
 J. N. COOKE.